United States Patent [19]
Hongu et al.

[11] Patent Number: 6,016,361
[45] Date of Patent: Jan. 18, 2000

[54] METHOD AND APPARATUS FOR COMPRESSING BINARY DATA USING PATTERN MATCHING ENCODING

[75] Inventors: Takahiro Hongu; Kouichirou Hirao, both of Tokyo, Japan

[73] Assignee: NEC Corporation, Tokyo, Japan

[21] Appl. No.: 08/964,633

[22] Filed: Nov. 5, 1997

[30] Foreign Application Priority Data

Nov. 5, 1996 [JP] Japan .................................. 8-308771

[51] Int. Cl.[7] ................................................... G06K 9/36
[52] U.S. Cl. .......................................... 382/209; 358/470
[58] Field of Search ..................................... 382/258, 209, 382/217, 218, 221, 243; 358/470

[56] References Cited

U.S. PATENT DOCUMENTS

| | | | |
|---|---|---|---|
| 4,410,916 | 10/1983 | Pratt et al. ................................. | 358/263 |
| 4,503,557 | 3/1985 | Maeda ......................................... | 382/34 |
| 4,606,069 | 8/1986 | Johnsen ....................................... | 382/56 |
| 4,944,022 | 7/1990 | Yasujima et al. .......................... | 382/14 |
| 5,303,313 | 4/1994 | Mark et al. ................................. | 382/56 |
| 5,727,140 | 3/1998 | Ohtomo et al. ........................... | 395/167 |

FOREIGN PATENT DOCUMENTS

| | | | |
|---|---|---|---|
| 1-118966 | 5/1989 | Japan ............................... | G06F 15/70 |
| 2-194772 | 8/1990 | Japan ............................... | H04N 1/415 |
| 3-240173 | 10/1991 | Japan ............................... | G06F 15/66 |
| 6-38048 | 2/1994 | Japan ............................... | H04N 1/411 |
| 2 160 062 | 12/1985 | United Kingdom ............. | H04N 1/41 |

Primary Examiner—Andrew W. Johns
Attorney, Agent, or Firm—Foley & Lardner

[57] ABSTRACT

In a method and an apparatus for pattern matching encoding disclosed a font bit map library is provided separately from a temporary updating library, in which temporary bit map pattern data capable of being updated according to a character pattern cut out from input binary image data is stored. In the font bit map library is stored font bit map library pattern data of an input character pattern font or a font designated by the user. A pattern matching process on the character pattern, is executed by comparing the character pattern with temporary bit map pattern data and font bit map pattern data. The character pattern is newly registered in the temporary updating library, when it is judged as being matched with only the temporary bit map pattern or as being matched with neither of the temporary bit map pattern or the font bit map pattern. It is possible to improve data compressibility without sacrifice in image quality.

19 Claims, 6 Drawing Sheets

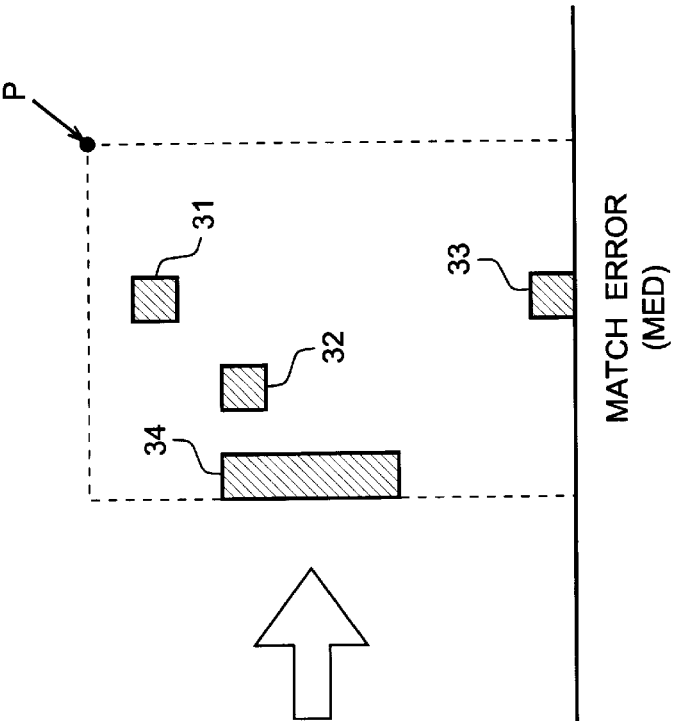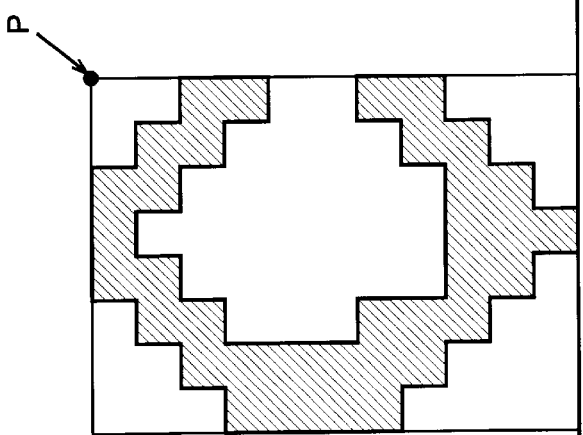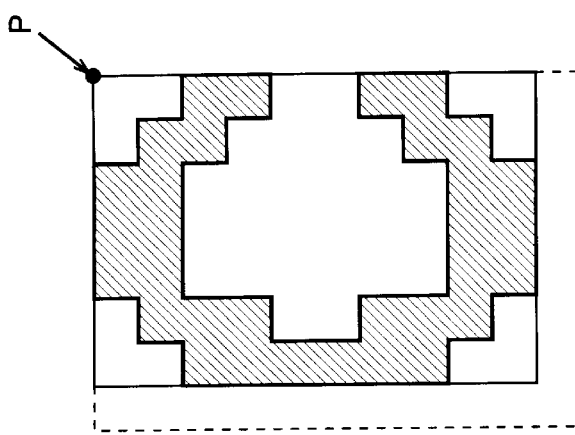

Fig. 6

|   | 1 | 2 | 3 |   |
|---|---|---|---|---|
| 4 | 5 | 6 | 7 | 8 |
| 9 | 10 | X |   |   |

(EXTRACTED PATTERN)
TEMPLATE FOR UNMATCHED MARK PATTERN

Fig. 7A

| 1 | 2 | 3 |
|---|---|---|
| 4 | X |   |

(EXTRACTED PATTERN)
TEMPLATE FOR MATCHED
MARK PATTERN

Fig. 7B

|   | 5 |   |
|---|---|---|
| 6 | 7 | 8 |
| 9 | 10 | 11 |

SAME POSITION AS X (LIBRARY PATTERN)
TEMPLATE FOR MATCHED
MARK PATTERN

METHOD AND APPARATUS FOR COMPRESSING BINARY DATA USING PATTERN MATCHING ENCODING

BACKGROUND OF THE INVENTION (1) Field of the Invention

The present invention relates to an image data compression apparatus, and more particularly to a method and an apparatus for pattern matching encoding, in which binary data are compressed by using pattern matching.

(2) Description of the Related Art

U.S. Pat. No. 5,303,313 discloses a process of inputting a binary stationary image using a scanner and compressing bit map data of the input image. In this disclosed process, input image data obtained using a scanner or the like is precompressed by a run length encoding or like processes, and then cut to patterns. Then, template data and pattern position data are generated by making matching of each cut pattern and a registered template. In this way, the input bit map data is compressed into data comprised of template codes and pattern position data.

Another image data compression apparatus has been proposed in order to improve data compressibility in applications to hand-written characters or indefinite type characters. This system has a temporary library, which is capable of newly registering and updating bit map data to be compared with input bit map data according to the input data.

FIG. 1 is a block diagram showing a prior art binary stationary image pattern matching encoder having a temporary updating library. Referring to the Figure, text image data inputted from a scanner, is binarized and smoothed for improving the compressibility in encoding and the visual image quality. A pattern extracting unit 101 executes pattern extraction from the smoothed data, and outputs bit map data of a mark pattern to a matching unit 102. The matching unit 102 compares the mark pattern with bit map patterns stored in a temporary updating library 103. When the ratio of unmatched pixels to all pixels is not above a predetermined ratio, the matching unit 102 judges the result of the comparison as being matched, and when the ratio is above the predetermined ratio, it judges the result as being unmatched.

When the matching unit 102 Judges the result of the comparison as being matched, it outputs to a multi-symbol arithmetic encoding unit 105 the ID of the matched bit map in the temporary updating library and the positioning data used when the matching is made whereby the data compression is made. A match error correcting unit 104 inverts match error pixels of bit map data of mark patterns which are judged as being matched. The corrected bit map data are ID registered in the temporary updating library 103. Bit map data of mark patterns which are judged as being unmatched, are ID registered in the temporary updating library 103 with no correction. In the temporary updating library 103, library bit maps of low matching frequencies are deleted.

In carrying out the compression of the mark pattern bit map data, the estimation template pixels which are generated in an unmatched mark pattern template generating unit 106 are used for unmatched mark patterns, while the estimation template pixels which are generated in a matched mark pattern template generating unit 107 are used for matched mark patterns.

The above prior art system, however, has problems which are posed by the precompressing and smoothing processes executed prior to the matching process for improving the data compressibility and also by the updating of the temporary updating library with the data obtained after the match error correction.

A first problem concerns the image quality. In the match error correcting process after the matching process with the temporary updating library, the match error pixels are inverted. This process is executed in order to improve the data compressibility. The match error pixel inversion, however, results in an image quality sacrifice. Besides, the bit map data of the mark patterns obtained in the match error correcting process are successively registered in the library. Successively registering the mark pattern bit map data results in accumulation of image distortions arising from the match error correcting process, thus resulting in image quality deterioration. The image quality deterioration is particularly pronounced with document texts printed using fonts, which are obtainable with personal computers and word processors recently finding increasing applications.

A second problem is that optimization is lacking from the standpoint of the data compressibility improvement.

For example, bit map data of a mark pattern of the same character is subject to slight variations depending on the accuracy of the scanner, thus causing the mark pattern bit map data of the same character to be updated in the temporary updating library. Such updating of data results in storing a plurality of different data of the same character in the temporary updating library. With a finite library memory, therefore, there arises a shortage of types of character marks of bit map data for matching.

SUMMARY OF THE INVENTION

An object of the invention, therefore, is to overcome the problems existing in the prior art, and to provide a method and an apparatus for pattern matching encoding, which can improve the data compressibility without image quality deterioration.

The above object of the invention is attained by a pattern matching encoding apparatus for encoding unit patterns extracted from input binary image data based on a result of matching of the unit patterns with library patterns, which comprises first memory means for storing first library patterns capable of being updated according to the input patterns, second memory means for storing second library patterns of a preliminarily designated font, and pattern matching means for executing a pattern matching process of matching the unit patterns by comparison thereof with the first and second library patterns.

Also, the above object of the invention is attained by a pattern matching encoding method according to the invention, in which each of the unit patterns is newly registered when the unit pattern is judged as being matched with only the first library pattern although partially unmatched therewith or when the unit pattern is judged as being matched with neither of the first and second library patterns.

According to the invention, with the provision of the second memory means in which second library patterns of a designated font are stored, in addition to the first memory means in which first library patterns are stored, it is possible to use, for instance, standard font bit map patterns along with the first library patterns for the pattern matching process and attain significant image quality improvement.

In addition, by permitting an input image pattern to be newly registered in the first memory means only when the input image pattern is judged as being matched with neither of the first and second library patterns or as being matched with only the first library patterns, it is possible to avoid wasteful pattern registration in the first memory means and attain efficient use of the pattern matching encoder. Thus, by storing fonts used in personal computers or word processors in the second memory means, it is possible to improve the matching ratio of mark patterns of a document text printed using font and significantly improve the data compressibility of image data.

BRIEF DESCRIPTION OF THE DRAWINGS

The above and other objects, features and advantages of the present invention will be apparent from the following description of preferred embodiments of the invention explained with reference to the accompanying drawings, in which:

FIGS. 5A to 5C are schematic views showing an example of bit map pattern for describing a matching process executed in the embodiment;

FIG. 6 is a schematic view showing an example of matched mark pattern template; and FIGS. 7A and 7B are schematic views showing an example of matched mark pattern template, FIG. 7A showing a pixel x to be encoded and four peripheral pixels, FIG. 7B showing seven bit map data pixels in a matched mark pattern library.

PREFERRED EMBODIMENT OF THE INVENTION

Figure 1:
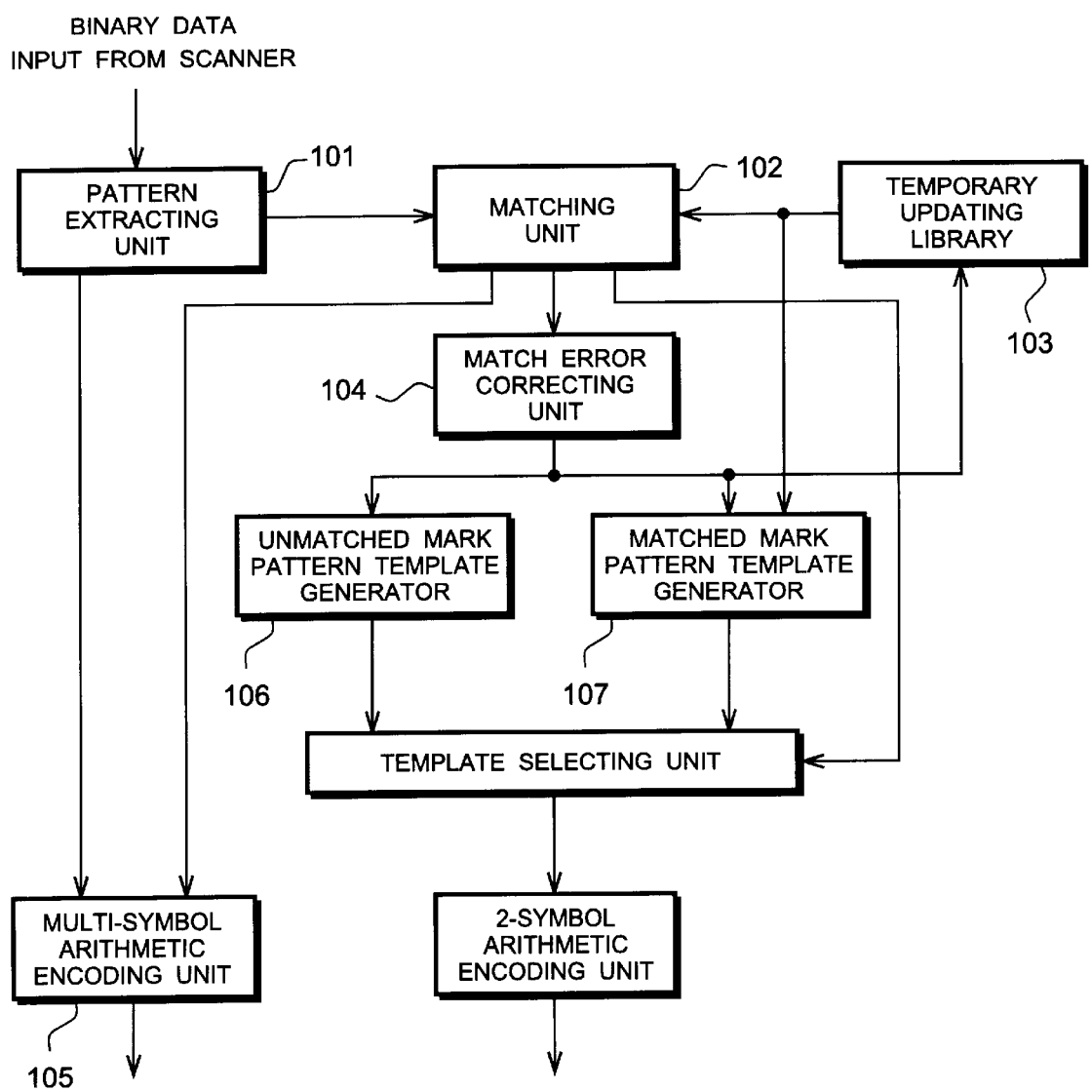
FIG. 1 is a block diagram showing a prior art binary stationary image pattern matching encoder having a temporary updating library.
Figure 2:
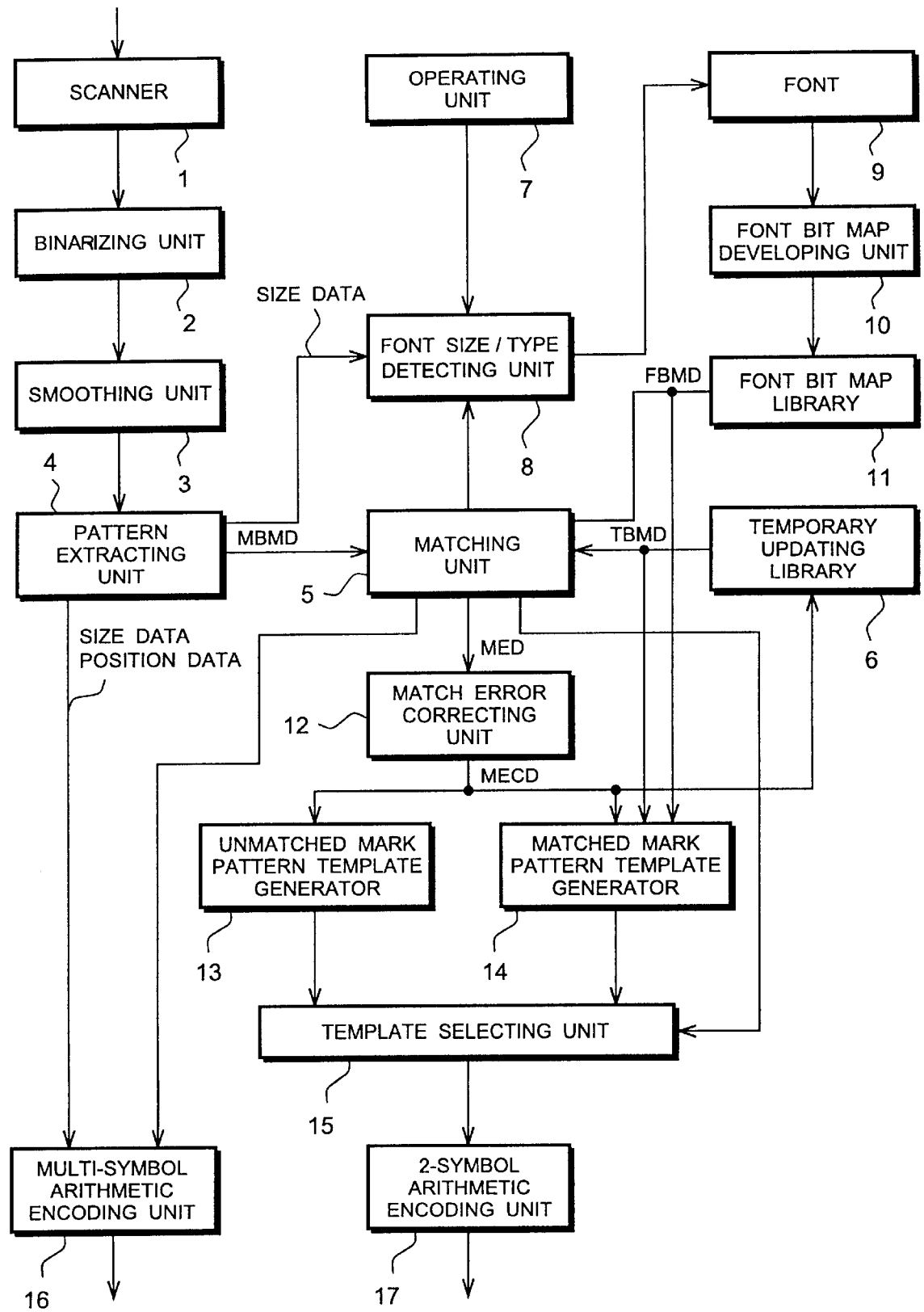
FIG. 2 is a block diagram showing a pattern matching encoding apparatus as an embodiment of the invention.

FIG. 2 is a block diagram showing a pattern matching encoding apparatus as a first embodiment of the invention. Referring to the Figure, a binarizing unit 2 converts read-out data of a document text inputted from a scanner 1 into black-and-white binary image data. A smoothing unit 3 which receives the binary image data, removes notches and isolated pixels to obtain smoothed data for improving the data compressibility in encoding and the visual image quality. A pattern extracting unit 4 which receives the smoothed data, cuts out character units and extracts mark patterns thereof as will be described later in detail.

In the above mark pattern extracting process, a mark pattern bit map data MBMD is obtained, which is outputted to a matching unit 5. The matching unit 5 executes matching between temporary bit map data and font bit map data. The temporary bit map data are stored in a temporary updating library 6. Bit map data candidates having similarities and required to be compared are outputted therefrom to the matching unit 5 in response to instructions from the matching unit 5.

In the mark pattern extracting process, a mark pattern size data is also obtained, which is outputted to a font size/type detecting unit 8 to specify a font type of the input document text. When the font type and the character size of the input document text are known, the user may input these character data to the font size/type detecting unit 8 via an operating unit 7. The specified font type data is outputted to a font storage 9. In the font storage 9, standard font data which are usually used in personal computers and word processors are stored. The font storage 9 outputs font data corresponding to character type data inputted from the font size/type detecting unit 8 to a font bit map developing unit 10. The font bit map developing unit 10 develops the input font data into corresponding bit map data. The bit map data is registered together with ID thereof in a font bit map library 11.

At the matching unit 5, the mark pattern bit map data MBMD inputted from a pattern extracting unit 4 are first compared with the font bit map data FBMD inputted from a font bit map library 11. When the matching unit 5 judges the data MBMD as being unmatched, then the comparison is made with temporary bit map data TBMD inputted from a temporary updating library 6. When unmatched pixels are found as a result of this comparison, the matching unit 5 outputs data of such unmatched pixels as match error data MED to a match error correcting unit 12 (updating control means) for match error correction. When the matching unit 5 judges the data MBMD as being matched with neither of the data FBMD and TBMD, no correction is made. The match error correcting unit 12 updates the temporary updating library 6 only when the data MBMD is judged as being matched with neither of the two compared data or when the data MBMD is judged as being matched with the temporary bit map data TBMD although partially unmatched therewith. Specifically, when the mark pattern bit map data MBMD is judged as being matched with neither of the two compared data, it is newly ID registered in the temporary updating library 6. When the data MBMD is judged as being matched with the temporary bit map data TBMD, a corrected mark pattern bit map data is newly ID registered. When the data MBMD is newly ID registered, a low matching frequency library bit map is deleted from the temporary updating library 6.

Mark pattern bit map data are compressed by using estimation template pixels generated in an unmatched mark pattern template generator 13 for unmatched mark patterns, and estimation template pixels generated in a matched mark pattern template generator 14 for matched mark patterns. The matching unit 5 provides a matching judgment signal, according to which a template selecting unit 15 selects either unmatched or matched mark pattern estimation template pixels for compression in a 2-symbol arithmetic encoding unit 17. The matching unit 5 also outputs mark pattern size data and value data to a multi-symbol arithmetic encoding unit 16.

The operation of the embodiment having the above construction will now be described in detail with reference to FIGS. 3 to 7.

(Pattern extraction process)

Figure 3:
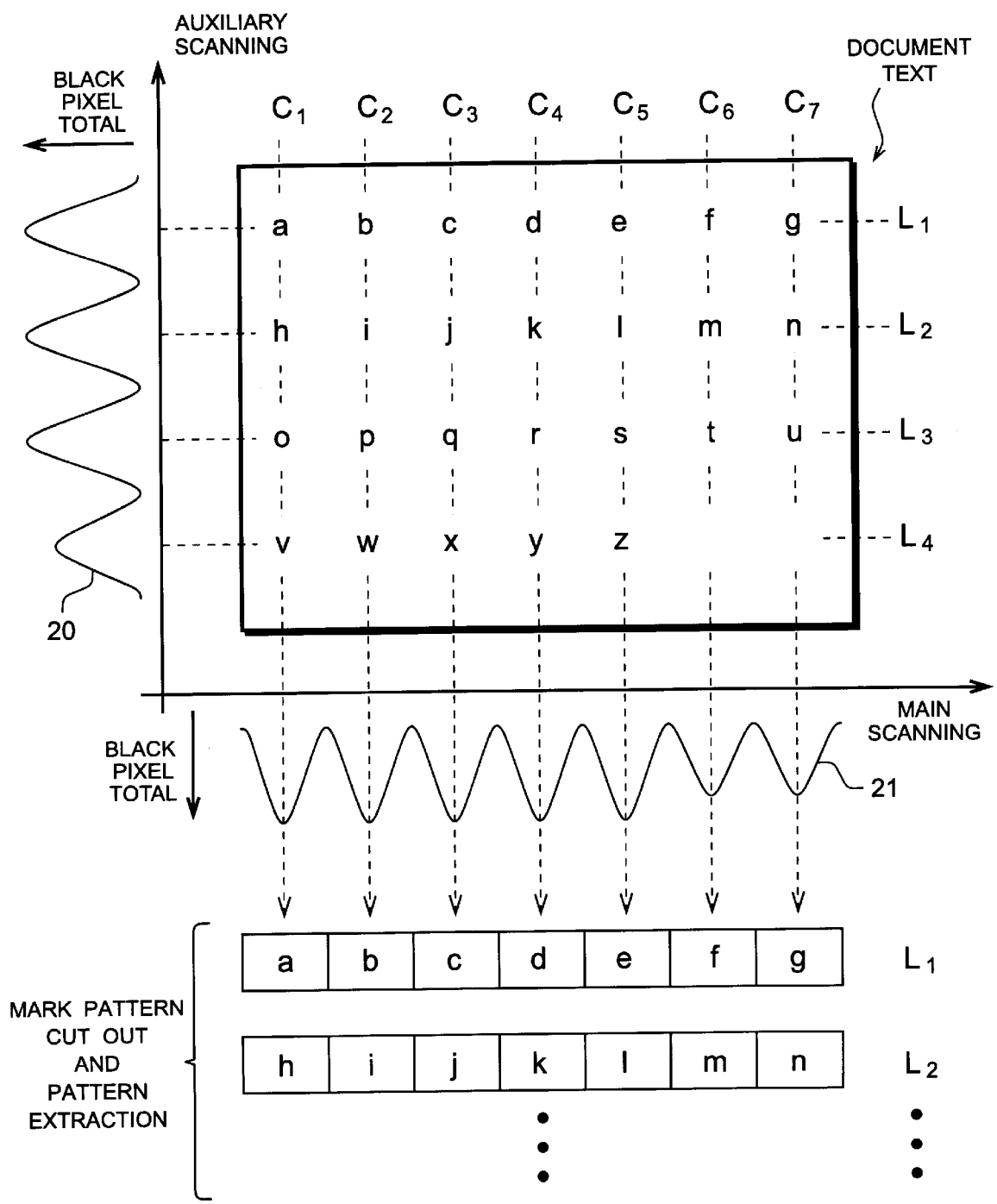
FIG. 3 is a schematic view for describing a projection division method, in which a pattern extracting unit cuts out character units.

FIG. 3 is a schematic view showing a projection division method executed by the pattern extracting unit 4 to cut out character units. It is assumed that binary image data are inputted to the pattern extracting unit 4 with scanning of a document text with characters written in four rows L1 to L4 and seven columns C1 to C7. The pattern extracting unit 4 cuts out each character and extracts the pattern thereof by using both a projection division method and a boundary tracing method as explained below.

As shown in FIG. 3, in the projection division process, black pixels are respectively counted in the main scanning direction and in the auxiliary scanning direction, and mark patterns are cut out by measuring the distribution of the black pixels. Lines having characters arranged side by side have large numbers of black pixels, and substantially no pixel is present between the lines. A pixel distribution waveform 20 is thus obtained in the auxiliary scanning direction in accordance with the distribution of black pixels. Row units can be separated by detecting the peak-to-peak interval of the waveform. By making similar measurement of black pixel distribution in the main scanning direction, a pixel distribution waveform 21 is obtainable in the main scanning direction in accordance with the black pixel distribution. Column units can be separated by detecting the peak-to-peak interval of the waveform. It is possible to cut out character units in each row by making such measurement of black pixel distribution.

Figure 4:
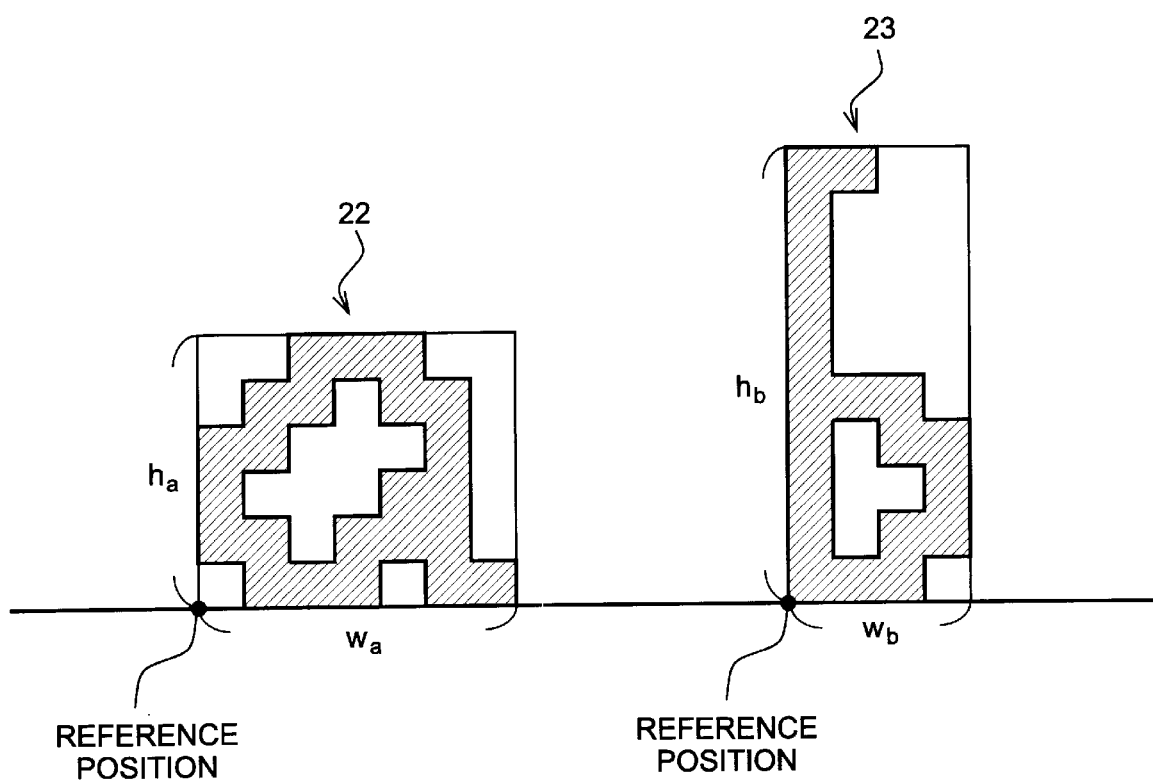
FIG. 4 is a schematic view showing character patterns for describing a boundary tracing method, in which the pattern extracting unit cuts out character units.

FIG. 4 is a schematic view showing character patterns for describing a boundary tracing method, in which the pattern extracting unit 4 cuts out character units. In the boundary tracing method, a group of intercoupled black pixels of binary image data is detected, and the smallest rectangle bit map containing the black pixel group is defined to be one mark pattern. FIG. 4 shows an example of mark patterns representing marks obtained from alphabet letters "a" and "b". With the extracted mark patterns, bit map data of the rectangles 22 and 23, data of the height h and width w of the rectangles, and position data of the marks at the document text, are generated. In the methods in which the sole boundary tracing method is used, a letter where all the black pixels are not intercoupled, such as letter "i" or "j", leads to a split mark pattern consisting of two separate parts. The above projection division process is effectively adopted for use in combination with the boundary tracing method to improve the character cut-out accuracy.

The mark pattern size data and mark pattern position data formed at the pattern extracting unit 4 are inputted to the multi-symbol arithmetic encoding unit 16 of data compression. The size data is outputted to the font size/type detecting unit 8, which determines a font type best matched to the font size through analysis of the input data. The output data that is outputted from the font size/type detecting unit 8 to the font memory 9 represents, for instance, Gothic as font type and 10 points as character size.

(Matching process)

The matching unit 5, to which the mark pattern bit map data is inputted from the pattern extracting unit 4, compares the inputted mark pattern with the bit map patterns stored in the font bit map library 11 and temporary updating library 6.

FIGS. 5A to 5C are schematic views showing an example of bit map pattern for describing a matching process in this embodiment. In this example, the matching process concerns an alphabet letter "c". When a mark pattern bit map data MBMD inputted from the scanner as shown in FIG. 5B is inputted, the matching unit 5 compares the data MBMD with bit map data FBMD and TBMD stored in the font bit map library 11 and temporary updating library 6, respectively. Actually, comparison is not made with all the bit maps stored in the libraries, but it is made with the bit map candidates being restricted. For example, a stored rectangular bit map in the libraries, which is relatively similar to the mark pattern in such condition as a size is selected as a candidate for the matching process. Where the mark pattern size is a condition of the candidate selection, a bit map of alphabet letter "c" which is stored in the font bit map library 11 or the temporary updating library 6, is relatively similar in the rectangle size to the mark pattern, and hence can be a candidate for the matching.

The matching is made with respect to the four corners of the rectangle and, among these corners, one of the least match error is selected. In the illustrated example, the upper right corner is the one in which the number of match error pixels is the smallest. Hence, the match error is obtained by making matching with respect to the upper right corner. The match error is obtained with bit map data which are read out as candidates from the library, and a candidate with the least match error is judged to be a matched mark pattern in the library.

In the matching process, mark pattern bit map data MBMD is compared with font bit map data FBMD stored in the font bit map library 11. When the data MBMD is judged as being unmatched, that is, when many match error pixels are present, the mark pattern is judged to be of a non-standard font (such a hand-written character or a graphic). The data MBMD is then compared with the bit map data TBMD stored in the temporary updating library 6. The match error pattern of the least match error found in these sequential matching operations and the bit map of the mark pattern are outputted to the match error correcting unit 12.

The judgment as to whether the mark pattern is matched or unmatched, is done with respect to the ratio of the number of pixels of the least match error to the number of all pixels of the mark pattern. In the example shown in FIGS. 5A and 5C, a letter "c" with the least match error among bit map candidates is selected. When the match error consists of 7 pixels while the mark pattern consists of 88 pixels, the unmatching ratio is about 8%. If it is prescribed that a mark pattern with an unmatching ratio of 10% or below is judged as being matched, the bit map data MBMD inputted from the scanner is judged as being matched by the bit map of the letter "c" in the library.

With a mark pattern which is judged as being matched in the above way, the ID of the matched bit map in the font bit map library 11 or temporary updating library 6 and the rectangle positioning data when the matching is made are outputted to the multi-symbol arithmetic encoder 16 for data compression. The bit map of the mark pattern judged as being matched and the match error data MED are outputted to the match error correcting unit 12 for match error correction to be described below.

(Match error correction process)

When match error pixels 31 to 34 as shown in FIG. 5C are detected in the above matching process, the match error correcting unit 12 executes inversion of the match error pixels. However, it is possible to provide some condition of inversion for the match error correction process instead of the absolute inversion. For example, in the case of FIG. 5C, the mark pattern bit map is inverted with respect to isolated match error pixels 31 to 33, but it is not inverted with respect to a match error pixel group 34 consisting of two or more continuous pixels. The match error correcting unit 12 does not execute any particular correcting process with a mark pattern which is judged in the matching unit 5 as being matched by neither of the bit maps in the font bit map library 11 and in the temporary updating library 6.

As described above, the mark pattern bit map data outputted from the match error correcting unit 12 is newly ID registered in the temporary updating library 6 only when it is judged as being unmatched or when it is matched by the bit map data in the temporary updating library 6, and at this time a low match frequency library bit map is deleted in the temporary updating library.

(Estimated template generation process)

The mark pattern bit map data is compressed by using estimation template pixels generated in the unmatched mark pattern template generator 13 for unmatched mark patterns and using estimation template pixels generated in the matched mark pattern template 14 for matched mark patterns.

FIG. 6 is a schematic view showing an example of unmatched mark pattern template. In this example, 10 pixels neighboring a pixel x to be encoded are used as estimation pixels for data compression. By the term "extracted pattern" in the Figure is meant a mark pattern bit map.

FIGS. 7A and 7B are schematic views showing an example of a match pattern template. For data compression, 4 pixels neighboring pixel x to be encoded as shown in FIG. 7A, and 7 pixels of the matched bit map data in the library shown in FIG. 7B are used. In the Figures, by the term "extracted pattern" is meant a mark pattern bit map, and by the term "library pattern" is meant the matched bit map in the library. In this example, the pixel at position No. 7 in the library pattern is at the same position as the pixel x to be encoded.

The estimation template pixels, which are generated in the unmatched and matched mark pattern template generators 13 and 14, respectively, are outputted together with the pixel x to be encoded to the template selecting unit 15, which selects the template to be used for compression according to the result of Judgment in the matching unit 5. The selected template pixels and the pixel x to be encoded are outputted to the 2-symbol arithmetic encoding unit 17 for bit map data compression in units of mark patterns.

Aside from the first embodiment of the invention as described above, in a second embodiment thereof, the font type and font size used in a document text are inputted from an operating unit 9, and font size and type date are outputted to the font size/type detecting unit 8, before the document text is read with the scanner 1. With this arrangement, the probability of matching of the bit map data in the font bit map library 11 and the mark pattern bit map data generated in the pattern extracting unit 4 with each other can be increased, thus permitting improvement of the image quality and the data compression efficiency.

In a third embodiment of the invention, the condition of the new ID registration in the temporary updating library 6 is alleviated as follows. In the first embodiment, the new ID registration of the mark pattern bit map data from the match error correcting unit 12 in the temporary updating library 6, is permitted only when the bit map data is judged as being unmatched or matched by the bit map data in the temporary updating library 6. In the third embodiment, the bit map data is newly ID registered in the temporary updating library 6 also when it is matched by the bit map data in the font bit map library 11. This third embodiment is applicable to communication data compression, for instance. This is so because communication of compressed data can be realized even when the opposite party of the communication does not have the font and font bit map library but has only the temporary updating library.

According to the invention, significant image quality improvement can be attained by using standard font bit map data together with bit map data registered in the temporary updating library. In addition, it is possible to avoid wasteful data registration in the temporary updating library and attain efficient use of the encoder by permitting new registration of an input image pattern only when the image pattern is judged as being matched with neither the temporary bit map pattern nor the standard font bit map pattern or is judged as being matched by the sole temporary bit map pattern and corrected. Thus, by storing fonts which are used in personal computers and word processors, it is possible to improve the matching ratio with mark patterns of font printed document texts and significantly improve the image data compressibility.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A pattern matching encoding apparatus for encoding unit patterns extracted from input binary image data based on a result of matching of the unit patterns with library patterns, said pattern matching encoding apparatus comprising:

a first memory means for storing first library patterns capable of being updated according to the unit patterns;

a second memory means for storing second library patterns of a preliminarily designated font; and a pattern matching means for executing a pattern matching process of matching the unit patterns by comparison of the unit patterns with the first library patterns and the second library patterns.

2. The pattern matching encoding apparatus according to claim 1, which further comprises:

updating control means for newly registering each of the unit patterns in the first memory means when the unit patterns are judged by the pattern matching means as being matched with the first library patterns although partially unmatched therewith.

3. The pattern matching encoding apparatus according to claim 2, wherein the updating control means newly registers each of the unit patterns in the first memory means when the unit pattern is judged by the pattern matching means as being matched with neither of the first and second library patterns.

4. The pattern matching encoding apparatus according to claim 3, wherein the pattern matching means executes the pattern matching process by comparing bit map data of each of the unit patterns with bit map data of the first library patterns and the second library patterns and judging the unit pattern as being matched when the ratio of the number of unmatched pixels in the bit map data is not greater than a predetermined ratio and as being unmatched when the ratio is greater than the predetermined ratio.

5. The pattern matching encoding apparatus according to claim 2, wherein the pattern matching means executes the pattern matching process by comparing bit map data of each of the unit patterns with bit map data of the first library patterns and the second library patterns and judging the unit pattern as being matched when the ratio of the number of unmatched pixels in the bit map data is not greater than a predetermined ratio and as being unmatched when the ratio is greater than the predetermined ratio.

6. The pattern matching encoding apparatus according to claim 1, wherein the pattern matching means executes the pattern matching process by comparing bit map data of each of the unit patterns with bit map data of the first library patterns and the second library patterns and judging the unit pattern as being matched when the ratio of the number of unmatched pixels in the bit map data is not greater than a predetermined ratio and as being unmatched when the ratio is greater than the predetermined ratio.

7. The pattern matching encoding apparatus according to claim 1, which further comprises:

a font storage means for storing a plurality of different fonts;

a font designating means for designating one of the plurality of fonts; and a font developing means for developing the designated font into a font bit map to generate the second library patterns.

8. The pattern matching encoding apparatus according to claim 7, wherein the font designating means designates a font by detecting the font size and font type from the unit patterns.

9. The pattern matching encoding apparatus according to claim 7, wherein the font designating means includes an operating means for externally executing the font designation.

10. A method of pattern matching encoding of unit patterns extracted from input binary image data based on a result of matching of the unit patterns with library patterns, comprising the steps of:

storing first library patterns capable of being updated according to each of the unit patterns;

storing second library patterns of a preliminarily designated font;

comparing the unit pattern with the first library patterns and the second library patterns; and newly registering the unit patterns as the first library patterns when the unit patterns are judged as being matched with only the first library patterns although partially unmatched therewith or when the unit patterns are judged as being matched with neither of the first and second library patterns.

11. A pattern matching encoding apparatus for encoding unit patterns extracted from input binary image data based on a result of matching of the unit patterns with library patterns, said pattern matching encoding apparatus comprising:

a first memory configured to store first library patterns capable of being updated according to the unit patterns;

a second memory configured to store second library patterns of a preliminarily designated font; and a pattern matching circuit configured to execute a pattern matching process of matching the unit patterns by comparison of the unit patterns with the first library patterns and the second library patterns.

12. The pattern matching encoding apparatus according to claim 11, which further comprises:

an updating control circuit configured to newly register each of the unit patterns in the first memory when the unit patterns are judged by the pattern matching circuit as being matched with the first library patterns although partially unmatched therewith.

13. The pattern matching encoding apparatus according to claim 12, wherein the updating control circuit newly registers each of the unit patterns in the first memory when the unit pattern is judged by the pattern matching circuit as being matched with neither of the first and second library patterns.

14. The pattern matching encoding apparatus according to claim 13, wherein the pattern matching circuit executes the pattern matching process by comparing bit map data of each of the unit patterns with bit map data of the first library patterns and the second library patterns and judging the unit pattern as being matched when the ratio of the number of unmatched pixels in the bit map data is not greater than a predetermined ration and as being unmatched when the ratio is greater than the predetermined ratio.

15. The pattern matching encoding apparatus according to claim 12, wherein the pattern matching circuit executes the pattern matching process by comparing bit map data of each of the unit patterns with bit map data of the first library patterns and the second library patterns and judging the unit pattern as being matched when the ratio of the number of unmatched pixels in the bit map data is not greater than a predetermined ratio and as being unmatched when the ratio is greater than the predetermined ratio.

16. The pattern matching encoding apparatus according to claim 11, wherein the pattern matching circuit executes the pattern matching process by comparing bit map data of each of the unit patterns with bit map data of the first library patterns and the second library patterns and judging the unit pattern as being matched when the ratio of the number of unmatched pixels in the bit map data is not greater than a predetermined ration and as being unmatched when the ratio is greater than the predetermined ratio.

17. The pattern encoding apparatus according to claim 11, which further comprises:

a font storage configured to store a plurality of different fonts;

a font designating circuit configured to designate one of the plurality of fonts; and a font developing circuit configured to develop the designated font into a font bit map to generate the second library patterns.

18. The pattern matching encoding apparatus according to claim 17, wherein the font designating circuit designates a font by detecting the font size and font type from the unit patterns.

19. The pattern matching encoding apparatus according to claim 17, wherein the font designating circuit includes an operating circuit configured to execute the font designation externally.

* * * * *